United States Patent Office 3,499,060
Patented Mar. 3, 1970

3,499,060
METHOD OF MANUFACTURING BLOCK COPOLYMERS
Kazuo Suzuki, Amagasaki, and Okiyasu Yoshioka, Hyogoku, Kobe, Japan, assignors to Kanegafuchi Chemical Industry Co., Ltd., Osaka, Japan, a corporation of Japan
No Drawing. Filed Jan. 11, 1966, Ser. No. 519,956
Claims priority, application Japan, Jan. 29, 1965, 40/4,971; Sept. 27, 1965, 40/59,326
Int. Cl. B01j 11/00; C08f 15/04
U.S. Cl. 260—878                                11 Claims

ABSTRACT OF THE DISCLOSURE

A method of manufacturing single block copolymers containing at least 50 percent by mole ethylene component, consisting of a total of two blocks, wherein one of the blocks is a polymer of ethylene and another of the blocks is a copolymer of $\alpha$-olefine and ethylene, using a catalyst system which was prepared by the following steps: (a) adding titanium tetrachloride to a medium of indifferent hydrocarbon at a temperature of $-30°$ C. or less, (b) adding an organoaluminum compound having at least 4 carbon atoms in a proportion of about 0.5 to 1.2 moles to 1 mole of titanium tetrachloride to a medium of indifferent hydrocarbon at a temperature of $-30°$ C. or less, (c) contacting the two preceding preparations at a temperature of $-30°$ C. or less, and (d) adding ethylene corresponding to an amount under 2000 as molecular weight to 1 mole of titanium tetrachloride, into said contacted system while maintaining the temperature of $-30°$ C. or less.

---

This invention relates to a method of manufacturing block copolymers comprising ethylene and alpha olefine and containing at least 50 mole percent ethylene.

The manufacture of the block copolymers of the foregoing type usually comprised the steps of polymerizing ethylene and (alpha) $\alpha$-olefine together at a temperature ranging from $-20°$ C. to $90°$ C. and using a catalyst comprising titanium trichloride and triethylaluminum or diethylaluminum monochloride either within or without an inert hydrocarbon solvent. The block copolymers obtained by such a method usually have high molecular weight. Accordingly, their mechanical properties are good, but their workability is poor. To improve the workability, it is necessary to lower the molecular weight. However, covering the molecular weight may impair the mechanical properties. Block copolymers excelling in quality and devoid of such deficiencies are desired for industrial use.

Accordingly, an object of this invention is to manufacture profitably on an industrial scale block copolymers which excel in workability and other properties, such as mechanical strength.

These and other objects of this invention are attained in an illustrative method which yields a block copolymer comprising ethylene and alpha olefine and having more than 50 mole percent ethylene. Ethylene or a mixture of ethylene and alpha olefine is blown into an inert hydrocarbon solvent together with a catalyst system which is selected from the Ziegler-Natta group and prepared in a novel manner as will be explained hereinafter in greater detail to cause the formation of a segment of living macromolecule.

The term "living macromolecule" or "living segment" refers to a polymerized segment having a particular life time. The life time depends upon such factors as type of catalyst used, polymerization temperature, and type of monomer which is used. When considering a curve plotting the relationship between reduced viscosity and amount of yield, the more linear is this curve relationship and the greater its tangent, the longer is the lifetime of the segment. Thus, a block copolymer will be more readily attained.

The polymerized product is then copolymerized, in a manner which will be explained hereinafter in greater detail, with a mixture of alpha olefine and ethylene in the event ethylene was polymerized, or ethylene in the event a mixture of alpha olefine and ethylene was polymerized. A block copolymer is thus formed. The term "block copolymer" refers to a compound having a structure in which a polymer A consisting of monomers A, and a polymer B consisting of monomers B are chemically combined. The compound may be expressed by the schematic model:

$$AA\text{--}\text{-}AA \quad BBB\text{-}B$$

The alpha olefine employed herein may include propylene, 1-butene, 1-pentene, styrene, 1-hexane, and 4-methyl 1-pentene. These may be used singly or in combination of two or more.

The catalyst may be selected from among the Ziegler-Natta group. As a component of the catalyst system one compound of a transitional metal, e.g. titanium tetrachloride, may be used. Another component may be an organometallic compound, e.g. organoaluminum compounds having more than 4 carbon atoms. Examples of such organoaluminum compounds are tri-n-butyl aluminum, triisohexyl aluminum, tri-n-octyl aluminum, triisobutyl aluminum, tri-n-hexyl aluminum and tri-n-decyl aluminum. These latter compounds may be used singly or in combination of two or more. The desirable proportion of titanium tetrachloride to organometallic compound to be employed should be about 0.5 to 1.2 moles of organometallic compound to 1 mole of titanium tetrachloride. The use of a larger proportion of an organometallic compound would tend to make the catalytic system heterogeneous, and hence is undesirable.

As previously mentioned, the preparation of the catalytic system, the formation of the living segment, and the formation of the block copolymers, all are undertaken in an inert hydrocarbon solvent or other medium of indifferent hydrocarbon. Examples of such solvents are n-hexane, n-heptane, n-pentane, isooctane and other aliphatic hydrocarbons; toluene and other aromatic hydrocarbons. These may be used singly or in combination of two or more. The solvents should have a freezing point under the temperature of contact between titanium tetrachloride and the organometallic compound, and should not contain substances which may act as a catalytic poison, for example, water, oxygen. Those solvents which are dried to have less than 5 p.p.m. moisture and which are deoxidized are especially desirable. Any suitable amount of solvent may be used. In some cases it was found that use of 0.1 to 0.5 weight percent of titanium tetrachloride in a solvent was advantageous.

The manufacturing process may be carried out in the following manner.

In the first step, a container is filled with an inert gas, such as argon, nitrogen, etc., to replace the internal air. An inert hydrocarbon solvent and titanium tetrachloride are placed in the container and in an inert gas stream or ambient. In the subsequent steps of the process, all of the operations are performed under an inert gas stream on ambient. This system is maintained at a temperature below $-30°$ C. In another similar container, an inert hydrocarbon solvent and an organoaluminum compound are mixed and likewise maintained at a temperature below $-30°$ C. These two systems may be subsequently contacted by causing their mixture at a temperature below −30° C. In this way, a homogeneous catalytic system may be obtained.

This catalytic system may, however, turn into a heterogeneous system if the temperature rises above −30° C. The object of this invention may not be readily attained with such a heterogeneous system. This aspect of the invention may be more readily understood by comparing the results of tests on samples A, B, C and D of Examples 1 and 2 below. For this reason, the catalytic system is kept below −30° C. However, if ethylene is added to this system, the catalytic system may remain homogeneous at a temperature above −30° C. In this instance, if the amount of ethylene which is added to the catalytic system is excessive, the system will precipitate and become heterogeneous. Thus, it has been found, for example, that the amount of ethylene which may be added to said contacted system should be held to a molecular weight under 2000 based on mole of titanium tetrachloride in order to maintain the system homogeneous.

In the second step, ethylene or a mixture of alpha olefine and ethylene is polymerized at a temperature ranging from contact temperature (e.g. in some cases about −80° C.) to about 70° C., by using the foregoing catalytic system to produce the desired living segment. The aforementioned temperature range was selected to obtain optimum polymerization rate and optimum segment lifetime. If the temperature is above 70° C., the lifetime of the segment will not be entirely satisfactory. The amount of ethylene and the composition and amount of the mixture of alpha olefine and ethylene are determined by taking into account the composition, e.g., the percentage of alpha olefine, and the molecular weight of the final block copolymers which are desired.

When the polymerization step is completed, it is desirable to eliminate from the system, any excess monomers which may be remaining. This may be done, for example, by using a vacuum pump, or blowing in of inert gas, although other methods may be employed.

In the third step, a mixture of alpha olefine and ethylene or ethylene, depending upon which components were polymerized to form the living segment, is blown into the system containing the living segment at a temperature of below 70° C. (e.g. in some cases ranging from 20° C. to 70° C.), thereby to cause the copolymerization thereof with the formed living segment. The mixture of alpha olefine and ethylene is blown in when the formed living segment consists essentially of ethylene and, ethylene is blown in when the formed living segment consists essentially of α-olefine and ethylene. The composition and the amount of the mixture of α-olefine and ethylene or the amount of ethylene are determined by the desired composition and molecular weight of the intended block copolymer end product. The use of only α-olefine in place of the mixed gas will tend to deteriorate the mechanical properties of the block copolymer end product at low temperatures. The ethylene content of the block copolymer end product is over 50 by mole percent.

The polymer is separated out of a slurry obtained in the way mentioned above by distillation, filtration, or other methods. To this is added an aliphatic saturated alcohol containing hydrochloric acid, for example, methanol, ethanol, butanol and isopropanol, to bring it back to the slurry state once again and decompose the catalyst. The reseparated polymer end product is washed and then dried.

By the method of this invention, block copolymers consisting essentially of α-olefine and ethylene are obtained excelling in workability and having good mechanical and other properties. The following examples and the results of tests made on the products thereof substantiate the foregoing statement.

The following specific examples are given as being illustrative of the method of this invention.

EXAMPLE 1

In the first step a catalytic system is produced by placing 350 cc. of isooctane into a freely openable and closeable hermetically sealed container of 500 cc. capacity and equipped with an agitator. The container contained an argon atmosphere. (In this and all of the following examples the moisture content of the isooctane was 3.5 parts per million.) Next, 1.65 cc. of distilled titanium tetrachloride was added to the container and the contents were cooled to a temperature of about −75° C.

Concurrently, in another container of the same type, 3.79 cc. of distilled triisobutyl aluminum was dissolved in 150 cc. of isooctane and cooled to a temperature of about −75° C.

These two preparations were contacted together at a temperature under −75° C. Finally, ethylene is blown into this contacted system at the same temperature of about −75° C. for about two minutes.

In another step, 2 liters of isooctane was put into a third freely openable and closeable hermetically sealed container of 5 liter capacity, which contained an argon atmosphere. Into this container ethylene was then blown in at a temperature of about 50° C. and for about 9 minutes. The catalytic system produced according to the foregoing step was added concurrently to the container. After the 9 minutes it was found that ethylene segments were formed.

In the next step, any ethylene monomer remaining in the system was expelled by the use of a vacuum pump. Thereafter, a mixture of propylene and ethylene gas having a volume ratio of 9 to 1 was blown in to copolymerize it with the ethylene segmet. A slurry resulted which, under reduced pressure, was then separated into the solvent and the copolymer. The copolymer is again brought back to a slurry state by adding methanol containing hydrochloric acid to decompose the catalyst. Again, the slurry was separated into the solvent and the copolymer. In the final step, the copolymer was rinsed with a methanol aqua solution and then dried. In this way, the intended block copolymer was obtained. This will be designated as A for convenience of tabulating data obtained on tests run on a sample thereof.

To obtain a comparative sample, a heterogeneous system was first obtained by contacting titanium trichloride and triethyl aluminum in isooctane at room temperature. Into this catalytic solution ethylene was blown at about 50° C., yielding thereby an ethylene segment. Then, any remaining ethylene monomer was expelled. Next, a mixed gas of propylene and ethylene having a volume ratio of 9 to 1 was blown into this system at 50° C. In this manner, an ethylene-propylene and ethylene block copolymer was obtained. This will be designated as B.

The measurements of the melt index and various mechanical properties of A and B are compared in Table 1.

As is evident from the following table, it is evident that block copolymers produced by the method of this invention excel in workability and have good mechanical properties in spite of its low molecular weight.

TABLE 1

| | A | B |
|---|---|---|
| Reduced viscosity C=0.07 | 4.59 | 22.23 |
| Propylene content, (mole percent) | 1 | 1 |
| Melt index F (g./10 min.) | 2.36 | (¹) |
| Tensile yield strength (kg./cm.²) | 219.6 | 210.3 |
| Tensile modulus (kg./cm.²) | 8,530 | 8,300 |
| Ultimate tensile strength (kg./cm.²) | 220.8 | 181.3 |
| Ultimate elongation (percent) | 871.1 | 235.3 |
| Impact strength at 20° C. (kg. cm./cm.²) | Over 60 | Over 60 |
| Impact strength at 0° C. (kg. cm./cm.²) | 59.4 | 45.5 |
| Impact strength at −30° C. (kg. cm./cm.²) | 38 | 15.3 |
| Hardness (Rockwell Scale R) | 24 | 32 |

¹ Not flow out.

The data recorded in Table 1 and in all of the following tables were carried out according to the following standards:

The melt index was determined in accordance with ASTM Standard D1238–62T. The measurement conditions for melt index E were at 190° C. and 2160 grams, whereas for melt index F the same conditions were at 190° C. and 21600 grams.

The following tests were performed in accordance with ASTM Standard D638–64T, with the drawing speed, where applicable, being at 10 mm./mm.: Tensile yield strength, ultimate tensile strength, ultimate elongation and tensile modulus.

The Izod impact strength was measured in accordance with ASTM Standard D256–56, but with a notch, and at 20° C., 0° C., and −30° C. measuring temperatures.

The Rockwell hardness test was carried out in accordance with ASTM Standard D785–62.

The term "reduced viscosity $\eta_{red}$" refers to "specific viscosity/concentration $\eta_{sp./C.}$," C being in terms of g./dl. In the measuring of viscosity, decahydronaphthalene containing an antioxidant phenyl-$\beta$-napthylamine was used as a solvent. The measurement was performed, for example, at 135° C., with setting C=0.07, and using an Ubbelohde capillary viscometer (compact form).

EXAMPLE 2

The procedure employed in this example was similar to that employed in Example 1 except that 4.38 cc. of triisobutyl aluminum was used instead of 3.79 cc. and blowing in the ethylene for 15 minutes to form ethylene segments instead of 9 minutes. The resulting ethylene-propylene/ethylene block copolymer had a propylene content of 1.9 mole percent and a reduced viscosity of 12.67. This sample will be designated as C in Table 2 below.

For a comparative sample, as in Example 1, titanium trichloride and triethyl aluminum were contacted in isooctane at about room temperature. Into this catalyic system, ethylene was blown at about 50° C. Then, after expelling the remaining ethylene monomer, a mixed gas of propylene and ethylene having a volume ratio of 9 to 1 was blown into this system at a temperature of about 50° C. The result was a block copolymer of the same type with a propylene content of 2 mole percent and a reduced viscosity of 21.34. This sample is designated as D in Table 2 below.

The measurements of the melt index and the mechanical properties of these two products of Example 2 are compared in Table 2. From this table, it is evident that block copolymers produced according to the method of this invention excel in workability, have good mechanical properties in spite of its low molecular weight.

TABLE 2

|  | C | D |
|---|---|---|
| Reduced viscosity C=0.07 | 12.67 | 21.34 |
| Propylene content (mole percent) | 1.9 | 2 |
| Melt index F (g./10 min.) | C.13 | (¹) |
| Tensile yield strength (kg./cm.²) | 238.6 | 188.2 |
| Tensile modulus (kg./cm.²) | 9,480 | 6,900 |
| Ultimate tensile strength (kg./cm.²) | 229.6 | 172.8 |
| Ultimate elongation (percent) | 779 | 317.2 |
| Impact strength at 20° C. (kg. cm./cm.²) | Over 60 | Over 60 |
| Impact strength at −30° C. (kg. cm./cm.²) | 39.9 | 10.9 |
| Hardness (Rockwell Scale R) | 25 | 24 |

¹ Not flow out.

EXAMPLE 3

In this example, block copolymers having a propylene content ranging from 0 to 10 mole percent were produced according to the same procedure as in Example 1 except that for samples number 1 through 4 listed in Table 3 below, the ethylene was blown in at the time of the ethylene segment formation for about 10 minutes and for sample 5 the mixed gas of propylene and ethylene being in the volume ratio of 9 to 1 was blown in at the time of the propylene and ethylene segment formation for about 15 minutes.

The measurements of the melt index and the mechanical properties of these various samples were as shown in Table 3. As is evident from the table, as the propylene content increases, the melt index and elongation increase, but other properties tend to decrease. However, by increasing the propylene content, it is possible to obtain block copolymers further excelling in workability, and still have sufficiently good mechanical properties such as possessed by sample B of Example 1 or by sample D of Example 2.

TABLE 3

|  | No.1 | No.2 | No.3 | No.4 | No.5 |
|---|---|---|---|---|---|
| Reduced viscosity C=0.07 | 13.99 | 16.83 | 14.47 | 13.11 | 12.87 |
| Propylene content (mole percent) | 0 | 2.6 | 7.5 | 9.8 | 2.8 |
| Melt index F (g./10 min.) | (¹) | 0.1 | 0.29 | 0.488 | 0.024 |
| Tensile yield strength (kg./cm.²) | 244 | 223.7 | 220.8 | 182.8 | 196.4 |
| Tensile modulus (kg./cm.²) | 11,730 | 8,740 | 7,260 | 5,800 | 7,030 |
| Ultimate tensile strength (kg./cm.²) | 203.2 | 194.9 | 192 | 189.6 | 199.8 |
| Ultimate elongation (percent) | 336 | 447.2 | 632.2 | 664 | 685.6 |
| Impact strength at 20° C. (kg. cm./cm.²) | 60 | >60 |  | >60 |  |
| Impact strength at −30° C. (kg. cm./cm.²) | 43.2 | 18 |  | 15.81 |  |
| Hardness (Rockwell Scale R) | 33 | 25 |  | 20 |  |

¹ Not flow out.

EXAMPLE 4

This example was carried out using the same procedure as in Example 1 except that triisobutyl aluminum was used in a quantity of 2.84 cc., and that the ethylene was blown in at the time of the ethylene segment formation for about 9 minutes. The resulting product was ethylene-propylene and ethylene block copolymer having a propylene content of 5.0 mole percent and a reduced viscosity of 2.70.

The values of melt index E, tensile yield strength, tensile modulus, ultimate tensile strength, ultimate elongation and impact strength of this product were 0.16, 258.3, 9680, 220.3, 858.7, 40.6, and 12.2, respectively. The product excelled in workability and has good mechanical properties in spite of its small molecular weight.

EXAMPLE 5

The procedure used in this example was similar to that used in Example 1 except that 0.55 cc. of titanium tetrachloride, 1.26 cc. of triisobutyl aluminum, and 300 cc. of isooctane, respectively, were used and blowing in a propylene-ethylene mixed gas in the volume ratio of 9 to 1 for about 20 minutes to form a segment with a 19.9% stereospecificity. Subsequently, co-polymerization was carried out in a manner similar to that of Example 1 by blowing ethylene into this resulting system. A block copolymer was obtained having a propylene content of 39.6 mole percent and a reduced viscosity of 3.09.

The chemical composition and the molecular weight distribution of the resulting sample were uniform, and in addition, both of its workability and heat stability were found to be excellent.

Various modifications and extensions of this invention will become apparent to those skilled in the art. All such variations and deviations which, basically, rely on the teachings, through which this invention has advanced the art, are properly considered within the spirit and scope of this invention.

What is claimed is:
1. A method of manufacturing single block copolymers containing at least 50 percent by mole ethylene component, comprising the steps of:
   (1) adding concurrently to a container at a temperature within the range of from +20° C. to +70° C., a first monomer comprising ethylene and a catalyst system and polymerizing said first monomer to form a segment of living macromolecule, said catalyst system being prepared by the steps of
      (a) adding titanium tetrachloride to a medium of indifferent hydrocarbon at a temperature of

−30° C. and more than −78° C. in a container filled with an inert gas,
(b) adding an organoaluminum compound having at least 4 carbon atoms in a proportion of about 0.5 to 1.2 mole to 1 mole of titanium tetrachloride to a medium of indifferent hydrocarbon at a temperature of −30° C. and more than −78° C. in another container filled with and inert gas,
(c) contacting the two preceding preparations at a temperature of −30° C. and more than −78° C. and
(d) adding ethylene corresponding to an amount resulting in less than 2000 as molecular weight of polymer chain tetrachloride into the contacted system while maintaining the temperature of −30° C. and more than −78° C.

(2) adding a second monomer comprising a mixture of alpha olefine and ethylene to the inert hydrocarbon medium of said catalyst system having said living macromolecule therein, in the absence of any unreacted first monomer, at a temperature of more than +20° C. and less +70° C. and
recovering the single block copolymer produced.

2. The method according to claim 1, wherein said second monomer is contacted with said inert hydrocarbon medium after polymerization of substantially all of said first monomer.

3. The method according to claim 1, wherein after elimination of substantially all of the unreacted first monomer from said inert hydrocarbon medium the said second monomer is added to the reaction system.

4. The method of claim 1, wherein said first monomer is added to said inert hydrocarbon medium for a period of time ranging from 9 to 15 minutes and at a temperature of about +50° C.

5. The method of claim 1, wherein said organoaluminum compound is triisobutyl aluminum.

6. The method of claim 1, wherein said medium of indifferent hydrocarbon is isooctane.

7. The method according to claim 1, comprising the further steps of adding saturated aliphatic alcohol comprising methanol containing hydrochloric acid to decompose said catalyst system after production of said single block copolymer, and washing and drying the resulting product.

8. The method according to claim 7, comprising the further step of recovering said indifferent hydrocarbon medium after said single block copolymer is produced and before the addition of said saturated aliphatic alcohol.

9. The method of claim 1, wherein said mixture of alpha olefine and ethylene is a mixture of propylene and ethylene in a volume ratio of 9 to 1.

10. The method of claim 1, wherein said first monomer consists of a mixture of ethylene and α-olefine, and said second monomer consists of ethylene.

11. The method of claim 1, wherein said mixture of α-olefine and ethylene is a mixture of propylene and ethylene in a volume ratio of 9 to 1.

References Cited

UNITED STATES PATENTS

| | | | |
|---|---|---|---|
| 3,065,220 | 11/1962 | McManimie | 260—94.9 |
| 3,067,183 | 12/1962 | Hagemeyer et al. | 260—88.2 |
| 3,251,819 | 5/1966 | Ketley | 260—93.7 |

FOREIGN PATENTS

| | | |
|---|---|---|
| 957,777 | 5/1964 | Great Britain. |
| 889,659 | 2/1962 | Great Britain. |

MURRAY TILLMAN, Primary Examiner

M. J. JULLY, Assistant Examiner

U.S. Cl. X.R.

252—431; 260—94.9